(12) United States Patent
Zhao et al.

(10) Patent No.: US 8,982,061 B2
(45) Date of Patent: Mar. 17, 2015

(54) ANGULAR CONTACT GEOMETRY

(75) Inventors: Weidong Zhao, Redmond, WA (US); David A. Stevens, Sammamish, WA (US); Aleksandar Uzelac, Seattle, WA (US); Takahiro Shigemitsu, Bellevue, WA (US); Andrew David Wilson, Seattle, WA (US); Nigel Stuart Keam, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 786 days.

(21) Appl. No.: 13/099,288

(22) Filed: May 2, 2011

(65) Prior Publication Data

US 2012/0206377 A1    Aug. 16, 2012

Related U.S. Application Data

(60) Provisional application No. 61/442,219, filed on Feb. 12, 2011.

(51) Int. Cl.
*G06F 3/041* (2006.01)

(52) U.S. Cl.
CPC ..................................... *G06F 3/041* (2013.01)
USPC .......................................... 345/173; 345/178

(58) Field of Classification Search
CPC ................. G06F 3/041; G06F 3/0416; G06F 2203/04104
USPC .................. 345/156–184; 715/830, 863, 784; 705/2; 702/92, 104
See application file for complete search history.

(56) References Cited

U.S. PATENT DOCUMENTS

| 4,421,997 | A |   | 12/1983 | Forys |
|---|---|---|---|---|
| 5,493,294 | A | * | 2/1996 | Morita ......................... 340/988 |
| 5,825,352 | A | * | 10/1998 | Bisset et al. ................. 345/173 |
| 5,856,822 | A |   | 1/1999 | Du et al. |
| 5,943,043 | A |   | 8/1999 | Furuhata et al. |
| 6,008,636 | A |   | 12/1999 | Miller et al. |
| 6,091,406 | A |   | 7/2000 | Kambara et al. |

(Continued)

FOREIGN PATENT DOCUMENTS

| CN | 1242096 | 1/2000 |
|---|---|---|
| CN | 1761932 | 4/2006 |

(Continued)

OTHER PUBLICATIONS

"Input Testing Tool", U.S. Appl. No. 13/659,777, (Oct. 24, 2012), 31 pages.

(Continued)

*Primary Examiner* — Prabodh M Dharia
(74) *Attorney, Agent, or Firm* — Henry Gabryjelski; Kate Drakos; Micky Minhas

(57) ABSTRACT

In embodiments of angular contact geometry, touch input sensor data is recognized as a touch input on a touch-screen display, such as a touch-screen display integrated in a mobile phone or portable computing device. A sensor map is generated from the touch input sensor data, and the sensor map represents the touch input. The sensor map can be generated as a two-dimensional array of elements that correlate to sensed contact from a touch input. An ellipse can then be determined that approximately encompasses elements of the sensor map, and the ellipse represents a contact shape of the touch input.

20 Claims, 4 Drawing Sheets

(56) References Cited

U.S. PATENT DOCUMENTS

| | | | |
|---|---|---|---|
| 6,218,201 B1 | 4/2001 | Plangger et al. | |
| 6,323,846 B1 | 11/2001 | Westerman et al. | |
| 6,671,406 B1 | 12/2003 | Anderson | |
| 6,741,237 B1 | 5/2004 | Benard et al. | |
| 6,856,259 B1 | 2/2005 | Sharp | |
| 6,977,646 B1 | 12/2005 | Hauck et al. | |
| 7,053,887 B2 | 5/2006 | Kraus et al. | |
| 7,174,649 B1 | 2/2007 | Harris | |
| 7,254,775 B2 | 8/2007 | Geaghan et al. | |
| 7,295,191 B2 | 11/2007 | Kraus et al. | |
| 7,362,313 B2 | 4/2008 | Geaghan et al. | |
| 7,375,454 B2 | 5/2008 | Takasaki | |
| 7,489,303 B1 | 2/2009 | Pryor | |
| 7,580,556 B2 | 8/2009 | Lee et al. | |
| 7,592,999 B2 | 9/2009 | Rosenberg et al. | |
| 7,619,618 B2 | 11/2009 | Westerman et al. | |
| 7,711,450 B2 | 5/2010 | Im et al. | |
| 7,725,014 B2 | 5/2010 | Lam et al. | |
| 7,728,821 B2 | 6/2010 | Hillis et al. | |
| 7,746,325 B2 | 6/2010 | Roberts | |
| 7,797,115 B2 | 9/2010 | Tasher et al. | |
| 7,812,828 B2 | 10/2010 | Westerman et al. | |
| 7,907,750 B2 | 3/2011 | Ariyur et al. | |
| 7,938,009 B2 | 5/2011 | Grant et al. | |
| 7,978,182 B2* | 7/2011 | Ording et al. | 345/173 |
| 8,061,223 B2 | 11/2011 | Pan | |
| 8,174,273 B2 | 5/2012 | Geaghan | |
| 8,217,909 B2 | 7/2012 | Young | |
| 8,280,119 B2* | 10/2012 | Hamza | 382/117 |
| 8,314,780 B2 | 11/2012 | Lin et al. | |
| 8,493,355 B2 | 7/2013 | Geaghan et al. | |
| 8,725,443 B2 | 5/2014 | Uzelac et al. | |
| 8,773,377 B2 | 7/2014 | Zhao et al. | |
| 8,913,019 B2 | 12/2014 | Zhao et al. | |
| 8,914,254 B2 | 12/2014 | Uzelac et al. | |
| 2003/0164820 A1 | 9/2003 | Kent | |
| 2004/0207606 A1 | 10/2004 | Atwood et al. | |
| 2005/0012724 A1 | 1/2005 | Kent | |
| 2005/0063566 A1 | 3/2005 | Beek et al. | |
| 2006/0097991 A1 | 5/2006 | Hotelling et al. | |
| 2006/0175485 A1 | 8/2006 | Cramer | |
| 2006/0227120 A1 | 10/2006 | Eikman | |
| 2007/0081726 A1 | 4/2007 | Westerman et al. | |
| 2008/0041639 A1* | 2/2008 | Westerman et al. | 178/18.01 |
| 2008/0062140 A1 | 3/2008 | Hotelling et al. | |
| 2008/0068229 A1 | 3/2008 | Chuang | |
| 2008/0150909 A1 | 6/2008 | North et al. | |
| 2008/0158185 A1* | 7/2008 | Westerman | 345/173 |
| 2008/0180399 A1* | 7/2008 | Cheng | 345/173 |
| 2008/0211778 A1* | 9/2008 | Ording et al. | 345/173 |
| 2008/0211782 A1 | 9/2008 | Geaghan et al. | |
| 2008/0252616 A1 | 10/2008 | Chen | |
| 2008/0278453 A1 | 11/2008 | Reynolds et al. | |
| 2008/0284899 A1 | 11/2008 | Haubmann et al. | |
| 2008/0309624 A1* | 12/2008 | Hotelling | 345/173 |
| 2008/0309629 A1 | 12/2008 | Westerman et al. | |
| 2009/0009483 A1 | 1/2009 | Hotelling et al. | |
| 2009/0046073 A1 | 2/2009 | Pennington et al. | |
| 2009/0096753 A1* | 4/2009 | Lim | 345/173 |
| 2009/0141046 A1 | 6/2009 | Rathnam et al. | |
| 2009/0157206 A1 | 6/2009 | Weinberg et al. | |
| 2009/0160763 A1 | 6/2009 | Cauwels et al. | |
| 2009/0174679 A1 | 7/2009 | Westerman | |
| 2009/0190399 A1 | 7/2009 | Shibata et al. | |
| 2009/0225036 A1 | 9/2009 | Wright | |
| 2009/0241701 A1 | 10/2009 | Pan | |
| 2009/0250268 A1 | 10/2009 | Staton et al. | |
| 2009/0251435 A1 | 10/2009 | Westerman | |
| 2009/0251436 A1 | 10/2009 | Keskin | |
| 2009/0267903 A1 | 10/2009 | Cady et al. | |
| 2009/0273584 A1 | 11/2009 | Staton et al. | |
| 2009/0289922 A1 | 11/2009 | Henry | |
| 2009/0303202 A1 | 12/2009 | Liu | |
| 2009/0312009 A1 | 12/2009 | Fishel | |
| 2010/0053099 A1 | 3/2010 | Vincent et al. | |
| 2010/0060604 A1* | 3/2010 | Zwart et al. | 345/173 |
| 2010/0073318 A1 | 3/2010 | Hu et al. | |
| 2010/0103118 A1 | 4/2010 | Townsend et al. | |
| 2010/0103121 A1 | 4/2010 | Kim et al. | |
| 2010/0117962 A1 | 5/2010 | Westerman et al. | |
| 2010/0134429 A1 | 6/2010 | You et al. | |
| 2010/0142765 A1* | 6/2010 | Hamza | 382/117 |
| 2010/0193258 A1 | 8/2010 | Simmons et al. | |
| 2010/0214233 A1 | 8/2010 | Lee | |
| 2010/0231508 A1 | 9/2010 | Cruz-Hernandez et al. | |
| 2010/0277505 A1 | 11/2010 | Ludden et al. | |
| 2010/0302211 A1 | 12/2010 | Huang | |
| 2010/0309139 A1 | 12/2010 | Ng | |
| 2010/0315266 A1 | 12/2010 | Gunawardana et al. | |
| 2010/0315366 A1 | 12/2010 | Lee et al. | |
| 2010/0315372 A1 | 12/2010 | Ng | |
| 2011/0001633 A1* | 1/2011 | Lam et al. | 340/853.1 |
| 2011/0018822 A1* | 1/2011 | Lin et al. | 345/173 |
| 2011/0025629 A1 | 2/2011 | Grivna et al. | |
| 2011/0042126 A1 | 2/2011 | Spaid et al. | |
| 2011/0050620 A1* | 3/2011 | Hristov | 345/174 |
| 2011/0080348 A1 | 4/2011 | Lin et al. | |
| 2011/0084929 A1 | 4/2011 | Chang et al. | |
| 2011/0106477 A1* | 5/2011 | Brunner | 702/104 |
| 2011/0115709 A1 | 5/2011 | Cruz-Hernandez | |
| 2011/0115747 A1 | 5/2011 | Powell et al. | |
| 2011/0141054 A1 | 6/2011 | Wu | |
| 2011/0163766 A1 | 7/2011 | Geaghan | |
| 2011/0242001 A1 | 10/2011 | Zhang et al. | |
| 2011/0248941 A1* | 10/2011 | Abdo et al. | 345/173 |
| 2011/0261005 A1 | 10/2011 | Joharapurkar et al. | |
| 2011/0267481 A1 | 11/2011 | Kagei | |
| 2011/0298709 A1* | 12/2011 | Vaganov | 345/158 |
| 2011/0298745 A1* | 12/2011 | Souchkov | 345/174 |
| 2011/0299734 A1 | 12/2011 | Bodenmueller | |
| 2011/0304577 A1 | 12/2011 | Brown | |
| 2011/0304590 A1* | 12/2011 | Su et al. | 345/175 |
| 2012/0030624 A1* | 2/2012 | Migos | 715/830 |
| 2012/0032891 A1* | 2/2012 | Parivar | 345/173 |
| 2012/0065779 A1 | 3/2012 | Yamaguchi et al. | |
| 2012/0065780 A1 | 3/2012 | Yamaguchi et al. | |
| 2012/0068957 A1 | 3/2012 | Puskarich et al. | |
| 2012/0075331 A1 | 3/2012 | Mallick | |
| 2012/0105334 A1 | 5/2012 | Aumiller et al. | |
| 2012/0113017 A1 | 5/2012 | Benko et al. | |
| 2012/0131490 A1* | 5/2012 | Lin et al. | 715/773 |
| 2012/0146956 A1 | 6/2012 | Jenkinson | |
| 2012/0153652 A1 | 6/2012 | Yamaguchi et al. | |
| 2012/0187956 A1 | 7/2012 | Uzelac | |
| 2012/0188176 A1 | 7/2012 | Uzelac | |
| 2012/0188197 A1 | 7/2012 | Uzelac | |
| 2012/0191394 A1 | 7/2012 | Uzelac | |
| 2012/0206380 A1 | 8/2012 | Zhao | |
| 2012/0223894 A1 | 9/2012 | Zhao | |
| 2012/0268416 A1 | 10/2012 | Pirogov et al. | |
| 2012/0280934 A1 | 11/2012 | Ha et al. | |
| 2012/0280946 A1 | 11/2012 | Shih et al. | |
| 2012/0301009 A1* | 11/2012 | Dabic | 382/136 |
| 2012/0319992 A1 | 12/2012 | Lee | |
| 2013/0016045 A1* | 1/2013 | Zhao et al. | 345/173 |
| 2013/0063167 A1 | 3/2013 | Jonsson | |
| 2013/0113751 A1 | 5/2013 | Uzelac | |
| 2013/0197862 A1 | 8/2013 | Uzelac et al. | |
| 2013/0238129 A1 | 9/2013 | Rose et al. | |
| 2013/0345864 A1 | 12/2013 | Park | |
| 2014/0081793 A1* | 3/2014 | Hoffberg | 705/26.3 |
| 2014/0354310 A1 | 12/2014 | Hargrove et al. | |

FOREIGN PATENT DOCUMENTS

| | | |
|---|---|---|
| CN | 1942853 | 4/2007 |
| CN | 200947594 | 9/2007 |
| CN | 101553777 | 10/2009 |
| CN | 101661373 | 3/2010 |
| CN | 101937296 | 1/2011 |
| CN | 201828476 | 5/2011 |
| CN | 2201903594 | 7/2011 |
| CN | 202093112 | 12/2011 |
| CN | 101545938 | 1/2012 |

(56) References Cited

FOREIGN PATENT DOCUMENTS

| | | |
|---|---|---|
| CN | 202171626 | 3/2012 |
| CN | 202196126 | 4/2012 |
| CN | 102436334 | 5/2012 |
| CN | 101982783 | 7/2012 |
| DE | 19939159 | 3/2000 |
| EP | 2077490 | 7/2009 |
| EP | 2284654 | 2/2011 |
| JP | 2003303051 | 10/2003 |
| JP | 2007323731 | 12/2007 |
| KR | 20050003155 | 1/2005 |
| KR | 20050094359 | 9/2005 |
| KR | 100763057 | 10/2007 |
| KR | 20080066416 | 7/2008 |
| KR | 100941441 | 2/2010 |
| KR | 20100067178 | 6/2010 |
| KR | 20100077298 | 7/2010 |
| KR | 20100129015 | 12/2010 |
| KR | 101007049 | 1/2011 |
| KR | 20110011337 | 2/2011 |
| KR | 101065014 | 9/2011 |
| TW | 200925966 | 6/2009 |
| TW | M361674 | 7/2009 |
| TW | 201104513 | 2/2011 |
| WO | WO-9938149 | 7/1999 |
| WO | WO-2005114369 | 12/2005 |
| WO | WO-2006042309 | 4/2006 |
| WO | WO-2010073329 | 7/2010 |
| WO | WO-2013063042 | 5/2013 |

OTHER PUBLICATIONS

"Non-Final Office Action", U.S. Appl. No. 12/941,693, (May 16, 2013),13 pages.
"Non-Final Office Action", U.S. Appl. No. 13/183,377, (Jun. 21, 2013),10 pages.
"Non-Final Office Action", U.S. Appl. No. 13/293,060, (Jul. 12, 2013), 9 pages.
"PCT Search Report and Written Opinion", Application No. PCT/US2013/021787, (May 13, 2013), 9 pages.
"Touch Quality Test Robot", U.S. Appl. No. 13/530,692, (Jun. 22, 2012), 20 pages.
"PCT Search Report and Written Opinion", U.S. Appl. No. PCT/US2011/055621, (Jun. 13, 2012), 8 pages.
"International Search Report", Mailed Date: Sep. 3, 2012, Application No. PCT/US2012/024781, Filed Date: Feb. 11, 2012, p. 9.
"Final Office Action", U.S. Appl. No. 13/152,991, (Sep. 20, 2013),14 pages.
"Final Office Action", U.S. Appl. No. 13/183,377, (Oct. 15, 2013),12 pages.
"Final Office Action", U.S. Appl. No. 13/293,060, (Sep. 25, 2013),10 pages.
"Non-Final Office Action", U.S. Appl. No. 13/156,243, (Sep. 19, 2013),12 pages.
"Non-Final Office Action", U.S. Appl. No. 13/293,060, (Nov. 29, 2013),11 pages.
Tsuchiya, et al., "Vib-Touch: Virtual active touch interface for handheld devices", Retrieved at <<http://www.mech.nagoya-u.ac.jp/asi/en/member/shogo_okamoto/papers/tsuchiyaROMAN2009.pdf>>, The 18th IEEE International Symposium on Robot and Human Interactive Communication, Oct. 2, 2009, pp. 12-17.
Cao, et al., "ShapeTouch: Leveraging contact shape on interactive surfaces", Retrieved at <<http://www.cs.toronto.edu/~caox/tabletop2008_shapetouch.pdf>>, IEEE International Workshop on Horizontal Interactive Human Computer System (Tabletop), 2008, pp. 139-146.
Wilson, Andrew D., "TouchLight: An Imaging touch screen and display for gesture-based interaction", Retrieved at <<http://citeseerx.ist.psu.edu/viewdoc/download?doi=10.1.1.95.3647&rep=rep1&type=pdf>>, Oct. 13-15, 2004, pp. 8.
"Actuation Force of Touch Screen", *Solutions @ Mecmesin*, retrieved from <http://www.ArticleOnePartners.com/index/servefile?fileId=188971>,(Dec. 31, 2010),1 page.
"AO Touch Screen Tester", retrieved from <http://www.ao-cs.com/Projects/touch%20screeen%20tester%20project.html>, (Dec. 31, 2010), 1 page.
"Capacitive Touch Sensors—Application Fields, Technology Overview and Implementation Example", *Fujitsu Microelectronics Europe GmbH*; retrieved from http://www.fujitsu.com/downloads/MICRO/fme/articles/fujitsu-whitepaper-capacitive-touch-sensors.pdf on Jul. 20, 2011, (Jan. 12, 2010), 12 pages.
"Final Office Action", U.S. Appl. No. 12/941,693, (Nov. 26, 2012), 22 Pages.
"Haptic-Actuator Controllers", retrieved from <http://www.maxim-ic.com/products/data_converters/touch-interface/haptic-actuator.cfm> on May 4, 2011, 1 page.
"How to Use the Precision Touch Testing Tool", retrieved from <http://feishare.com/attachments/article/279/precision-touch-testing-tool-Windows8-hardware-certification.pdf>, (Apr. 15, 2012), 10 pages.
"International Search Report", Application No. PCT/US2011/058855, (Nov. 1, 2011), 8 pages.
"Linearity Testing Solutions in Touch Panels", retrieved from <advantech.com/machine-automation/ . . ./%7BD05BC586-74DD-4BFA-B81A-2A9F7ED489F/>, (Nov. 15, 2011), 2 pages.
"MAX11871", retrieved from <http://www.maxim-ic.com/datasheet/index.mvp/id/7203> on May 4, 2011, 2 pages.
"MicroNav Integration Guide Version 3.0", retrieved from <http://www.steadlands.com/data/interlink/micronavintguide.pdf>, (Dec. 31, 2003), 11 pages.
"Microsoft Windows Simulator Touch Emulation", retrieved from <blogs.msdn.com/b/visualstudio/archive/2011/09/30/microsoft-windows-simulator-touch-emulation.aspx>, (Sep. 30, 2011), 3 pages.
"Non-Final Office Action", U.S. Appl. No. 12/941,693, (Jul. 18, 2012), 19 pages.
"Non-Final Office Action", U.S. Appl. No. 13/152,991, (Mar. 21, 2013), 10 pages.
"OptoFidelity Touch and Test", retrieved from <http://www.ArticleOnePartners.com/index/servefile?fileId=188969, (Feb. 20, 2012), 2 pages.
"OptoFidelity Touch and Test", retrieved from <http://www.ArticleOnePartners.com/index/servefile?fileId=188420>, (May 4, 2012), 2 pages.
"OptoFidelity Two Fingers—robot", video available at <http://www.youtube.com/watch?v=YppRASbXHfk&feature=player_embedded#!section>, (Sep. 15, 2010), 2 pages.
"PCT Search Report and Written Opinion", Application No. PCT/US2012/027642, (Sep. 3, 2012), 9 pages.
"PCT Search Report and Written Opinion", Application No. PCT/US2012/024780, (Sep. 3, 2012), 9 pages.
"Projected Capacitive Test Fixture", retrieved from <http://www.touch-intl.com/downloads/DataSheets%20for%20Web/6500443-PCT-DataSheet-Web.pdf>, (2009), 2 pages.
"Resistive Touch Screen_Resistance Linearity Test", video available at <http://www.youtube.com/watch?v=hb23GpQdXXU>, (Jun. 17, 2008), 2 pages.
"Smartphone Automatic Testing Robot at UEI Booth", video available at <http://www.youtube.com/watch?v=f-Q4ns-b9sA>, (May 9, 2012), 2 pages.
"STM23S-2AN NEMA 23 Integrated Drive+Motor", Retrieved from: <http://www.applied-motion.com/products/integrated-steppers/stm23s-2an> on Jan. 24, 2012, 3 pages.
"Technology Comparison: Surface Acoustic Wave, Optical and Bending Wave Technology", *3M Touch Systems*, Available at >http://multimedia.3m.com/mws/mediawebserver?mwsId=66666UuZjcFSLXTtnXT2NXTaEVuQEcuZgVs6EVs6E666666--&fn=DST-Optical-SAW%20Tech%20Brief.pdf>,(2009), pp. 1-4.
"Touch Panel Inspection & Testing Solution", retrieved from <http://www.ArticleOnePartners.com/index/servefile?fileId=188967>, (Dec. 31, 2010), 1 page.
"Touch Panel Semi-Auto Handler Model 3810", retrieved from <http://www.chromaus.com/datasheet/3810_en.pdf>, (Dec. 31, 2010), 2 pages.

(56) References Cited

OTHER PUBLICATIONS

"TouchSense Systems Immersion", retrieved from <http://www.ArticleOnePartners.com/index/servefile?fileId=188486>, (Jun. 19, 2010), 20 pages.

"Using Low Power Mode on the MPR083 and MPR084", *Freescale Semiconductor Application Note*, Available at <http://cache.freescale.com/files/sensors/doc/app_note/AN3583.pdf>,(Nov. 2007), pp. 1-5.

Asif, Muhammad et al., "MPEG-7 Motion Descriptor Extraction for Panning Camera Using Sprite Generated", In *Proceedings of AVSS 2008*, Available at <http://ieeexplore.ieee.org/stamp/stamp.jsp?tp=&arnumber=4730384>,(Sep. 2008), pp. 60-66.

Baraldi, Stefano et al., "WikiTable: Finger Driven Interaction for Collaborative Knowledge-Building Workspaces", *Proceedings of the 2006 Conference on Computer Vision and Pattern Recognition Workshop* (CVPRW '06), available at <<http://ieeexplore.ieee.org/stamp/stamp.jsp?tp=&arnumber=1640590>>,(Jul. 5, 2006), 6 pages.

Benko, Hrvoje et al., "Resolving Merged Touch Contacts", U.S. Appl. No. 12/914,693, (Nov. 8, 2010), 22 pages.

Binns, Francis S., "Multi-"Touch" Interaction via Visual Tracking", *Bachelor of Science in Computer Science with Honours*, The University of Bath, available at <<http://www.cs.bath.ac.uk/~mdv/courses/CM30082/projects.bho/2008-9/Binns-FS-dissertation-2008-9.pdf>>,(May 2009), 81 pages.

Brodkin, Jon "Windows 8 hardware: Touchscreens, sensor support and robotic fingers", <<http://arstechnica.com/business/news/2011/09/windows-8-hardware-touch-screens-sensor-support-and-robotic-fingers.ars>>, (Sep. 13, 2011), 1 Page.

Buffet, Y "Robot Touchscreen Analysis", <<http://ybuffet.posterous.com/labsmotocom-blog-archive-robot-touchscreen-an>>, (Apr. 19, 2010), 2 Pages.

Cao, Xiang et al., "Evaluation of an On-line Adaptive Gesture Interface with Command Prediction", In *Proceedings of GI 2005*, Available at <http://citeseerx.ist.psu.edu/viewdoc/download;jsessionid=DAB1B08F620C23464427932BAF1ECF49?doi=10.1.1.61.6749&rep=rep1&type=pdf>,(May 2005),8 pages.

Cravotta, Robert "The Battle for Multi-touch", *Embedded Insights*, retrieved from <http://www.embeddedinsights.com/channels/2011/04/12/the-battle-for-multi-touch/> on May 4, 2011,(Apr. 12, 2011), 3 pages.

Dang, Chi T., et al., "Hand Distinction for Multi-Touch Tabletop Interaction", *University of Augsburg; Institute of Computer Science; Proceedings of the ACM International Conference on Interactive Tabletops and Surfaces*, (Nov. 23-25, 2009), 8 pages.

Dillencourt, Michael B., et al., "A General Approach to Connected-Component Labeling for Arbitrary Image Representations", *Journal of the Association for Computing Machinery*, vol. 39, No. 2, available at <<http://www.cs.umd.edu/~hjs/pubs/DillJACM92.pdf>>,(Apr. 1992), pp. 253-280.

Dillow, Clay "Liquid-Filled Robot Finger More Sensitive to Touch Than a Human's", retrieved from <www.popsci.com/technology/article/2012-06/new-robot-finger-more-sensitive-touch-human> on Jul. 27, 2012, (Jun. 19, 2012), 3 pages.

Hoggan, Eve et al., "Mobile Multi-Actuator Tactile Displays", In *2nd international conference on Haptic and audio interation design*, retrieved from <http://www.dcs.gla.ac.uk/~stephen/papers/HAID2.pdf >,(Oct. 29, 2007), 12 pages.

Hoshino, et al., "Pinching at finger tips for humanoid robot hand", Retrieved at <<http://web.mit.edu/zoz/Public/HoshinoKawabuchiRobotHand.pdf>>, (Jun. 30, 2005), 9 Pages.

Kastelan, et al., "Stimulation Board for Automated Verification of Touchscreen-Based Devices", *22nd International Conference on Field Programmable Logic and Applications*, Available at <https://www2.lirmm.fr/lirmm/interne/BIBLI/CDROM/MIC/2012/FPL_2012/Papers/PHD7.pdf>,(Aug. 29, 2012), at 2 pages.

Kastelan, et al., "Touch-Screen Stimulation for Automated Verification of Touchscreen-Based Devices", In *IEEE 19th International Conference and Workshops on Engineering of Computer Based Systems*, (Apr. 11, 2012), pp. 52-55.

Khandkar, Shahedul H., et al., "Tool Support for Testing Complex MultiTouch Gestures", *ITS 2010*, Nov. 7-10, 2010, Saarbrucken, Germany, (Nov. 7, 2010), pages.

Kjellgren, Olof "Developing a remote control application for Windows CE", Bachelor Thesis performed in Computer Engineering at ABE Robotics, Miilardalen University, Department of Computer Science and Electronics, Retrieved at <<http://www.idt.mdh.se/utbildning/exjobblfiles/TR0661.pdf>>,(May 30, 2007), 43 Pages.

Kuosmanen, Hans "OptoFidelity Automating UI Testing", video available at <http://www.youtube.com/watch?v=mOZ2r7ZvyTg&feature=player_embedded#!section>, (Oct. 14, 2010), 2 pages.

Kuosmanen, Hans "Testing the Performance of Touch-Enabled Smartphone User Interfaces", retrieved from <http://www.ArticleOnePartners.com/index/servefile?fileId=188442>, (Dec. 31, 2008), 2 pages.

Levin, Michael et al., "Tactile-Feedback Solutions for an Enhanced User Experience", retrieved from >http://www.pbinterfaces.com/documents/Tactile_Feedback_Solutions.pdf>, (Oct. 31, 2009), pp. 18-21.

McGlaun, Shane "Microsoft's Surface 2.0 Stress Testing Robot Called Patty Shown off for First Time", Retrieved at <<http://www_.slashgear._com/microsofts-surface-2_-0-stress-testing-robot_-called-patty-shown-off_-for_-first-time-19172971/>>, (Aug. 19, 2011), 1 Page.

McMahan, William et al., "Haptic Displayof Realistic Tool Contact via Dynamically Compensated Control of a Dedicated Actuator", *International Conference on Intelligent Robots and Systems*, St. Louis, MO, Oct. 11-15, 2009, retrieved from <http://repository.upenn.edu/meam_papers/222>,(Dec. 15, 2009), 9 pages.

Pratt, Susan "Factors Affecting Sensor Response", *Analog Devices*, AN-830 Application Note, Available at <http://www.analog.com/static/imported-files/application_notes/52957377291382187 42AN830_0.pdf>,(Dec. 2005), pp. 1-8.

Takeuchi, et al., "Development of a Muti-fingered Robot Hand with Softness changeable Skin Mechanism", *International Symposium on and 2010 6th German Conference on Robotics (ROBOTIK)*, Retrieved at <<http://ieeexplore.ieee.org/stamp/stamp.jsp?arnumber=05756853>>,(Jun. 7, 2010), 7 Pages.

Tao, Yufei et al., "An Efficient Cost Model for Optimization of Nearest Neighbor Search in Low and Medium Dimensional Spaces", *Knowledge and Data Engineering*, vol. 16 Issue:10, retrieved from <<http://www.cais.ntu.edu.sg/~jzhang/papers/ecmonns.pdf>> on Mar. 16, 2011,(Oct. 2004),16 pages.

Terpstra, Brett "BetterTouchTool Makes Multi-touch Infinitely More Useful, for Free", retrieved from <http://www.tuaw.com/2010/01/05/bettertouchtool-makes-multi-touch-infinitely-more-useful-for-fr/> on Jul. 20, 2012, (Jan. 5, 2010), 4 pages.

Toto, Serkan "Video: Smartphone Test Robot Simulates Countless Flicking and Tapping", retrieved from <techcrunch.com/2010/12/21/video-smartphone-test-robot-simulates-countless-flicking-and-tapping/>, (Dec. 21, 2010), 2 pages.

Westman, Tapani et al., "Color Segmentation by Hierarchical Connected Components Analysis with Image Enhancement by Symmetric Neighborhood Filter", *Pattern Recognition*, 1990. Proceedings., 10th International Conference on Jun. 16-20, 1990, retrieved from <<http://ieeexplore.ieee.org/stamp/stamp.jsp?tp=&arnumber=118219>> on Mar. 16, 2011,(Jun. 16, 1990), pp. 796-802.

Wimmer, Raphael et al., "Modular and Deformable Touch-Sensitive Surfaces Based on Time Domain Reflectometry", In *Proceedings of UIST 2011*, Available at <http://www.medien.ifi.lmu.de/pubdb/publications/pub/wimmer2011tdrTouch/wimmer2011tdrTouch.pdf>,(Oct. 2011),10 pages.

Zivkov, et al., "Touch Screen Mobile Application as Part of Testing and Verification System", *Proceedings of the 35th International Convention*, (May 21, 2012), pp. 892-895.

"Final Office Action", U.S. Appl. No. 12/941,693, Nov. 18, 2013, 21 Pages.

"Final Office Action", U.S. Appl. No. 13/154,161, Apr. 22, 2014, 16 pages.

"Final Office Action", U.S. Appl. No. 13/530,692, Apr. 10, 2014, 16 pages.

(56) References Cited

OTHER PUBLICATIONS

"Foreign Office Action", CN Application No. 201210018527.8, Feb. 24, 2014, 10 Pages.

"Foreign Office Action", CN Application No. 201210029859.6, Feb. 21, 2014, 15 Pages.

"International Search Report and Written Opinion", Application No. PCT/US2013/061067, Feb. 7, 2014, 11 pages.

"International Search Report and Written Opinion", Application No. PCT/US2013/046208, Sep. 27, 2013, 12 pages.

"Non-Final Office Action", U.S. Appl. No. 13/152,991, Mar. 21, 2014, 18 pages.

"Non-Final Office Action", U.S. Appl. No. 13/154,161, Jan. 3, 2014, 14 pages.

"Non-Final Office Action", U.S. Appl. No. 13/183,377, Feb. 27, 2014, 12 pages.

"Non-Final Office Action", U.S. Appl. No. 13/198,036, Jan. 31, 2014, 14 pages.

"Non-Final Office Action", U.S. Appl. No. 13/530,692, Jan. 31, 2014, 14 pages.

"Notice of Allowance", U.S. Appl. No. 13/156,243, Jan. 28, 2014, 8 pages.

"Notice of Allowance", U.S. Appl. No. 13/198,415, Dec. 26, 2013, 8 pages.

"Foreign Office Action", CN Application No. 201210031164.1, Mar. 5, 2014, 14 Pages.

"Restriction Requirement", U.S. Appl. No. 13/205,319, May 8, 2014, 6 pages.

"Corrected Notice of Allowance", U.S. Appl. No. 13/156,243, Jun. 6, 2014, 4 pages.

"Final Office Action", U.S. Appl. No. 13/152,991, Aug. 20, 2014, 14 pages.

"Final Office Action", U.S. Appl. No. 13/198,036, Aug. 14, 2014, 17 pages.

"Foreign Office Action", TW Application No. 101100606, Apr. 15, 2014, 10 pages.

"Non-Final Office Action", U.S. Appl. No. 13/530,692, Aug. 25, 2014, 18 pages.

"Non-Final Office Action", U.S. Appl. No. 13/205,319, Sep. 9, 2014, 13 pages.

"Non-Final Office Action", U.S. Appl. No. 13/293,060, Jul. 23, 2014, 12 pages.

"Notice of Allowance", U.S. Appl. No. 12/941,693, Aug. 13, 2014, 8.

"Notice of Allowance", U.S. Appl. No. 13/183,377, Jul. 18, 2014, 7 pages.

"Notice of Allowance", U.S. Appl. No. 13/362,238, Jul. 28, 2014, 11 pages.

"Search Report", TW Application No. 101100609, Oct. 16, 2014, 1 page.

"Foreign Office Action", CN Application No. 201210446236.9, Dec. 3, 2014, 11 pages.

"Non-Final Office Action", U.S. Appl. No. 13/152,991, Dec. 31, 2014, 18 pages.

"Notice of Allowance", U.S. Appl. No. 13/205,319, Dec. 19, 2014, 8 pages.

"Corrected Notice of Allowance", U.S. Appl. No. 13/362,238, Nov. 18, 2014, 2 pages.

"Extended European Search Report", EP Application No. 11840170.2, Jul. 16, 2014, 10 pages.

"Final Office Action", U.S. Appl. No. 13/293,060, Nov. 6, 2014, 14 pages.

"Foreign Notice of Allowance", CN Application No. 201110349777.5, May 28, 2014, 6 pages.

"Foreign Notice of Allowance", TW Application No. 101100606, Sep. 29, 2014, 4 pages.

"Foreign Office Action", CN Application No. 201210018527.8, Oct. 29, 2014, 12 pages.

"Foreign Office Action", CN Application No. 201210029859.6, Oct. 17, 2014, 8 Pages.

"Foreign Office Action", CN Application No. 201210031164.1, Sep. 11, 2014, 9 Pages.

"Notice of Allowance", U.S. Appl. No. 13/154,161, Nov. 7, 2014, 10 pages.

"Supplemental Notice of Allowance", U.S. Appl. No. 13/362,238, Sep. 18, 2014, 4 pages.

\* cited by examiner

ANGULAR CONTACT GEOMETRY

RELATED APPLICATION

This application claims priority to U.S. Provisional Application Ser. No. 61/442,219 filed Feb. 12, 2011 entitled "Angular Contact Geometry" to Zhao et al., the disclosure of which is incorporated by reference herein in its entirety.

BACKGROUND

Portable computing devices, such as mobile phones, portable and tablet computers, entertainment devices, handheld navigation devices, and the like increasingly offer more functions and features which can make it difficult for a user to navigate and select commands that are relevant to a function the user wants to initiate on a device. In addition to the traditional techniques used to interact with computing devices, such as a mouse, keyboard, and other input devices, touch sensors and touch-screen displays are commonly integrated in mobile phones and tablet computers, and are utilized both for display and user-selectable touch and gesture inputs. A continuing design challenge with these types of portable devices having touch sensors and/or touch-screen displays is the inherent inaccuracy of touch and gesture inputs, due primarily to the size of users' fingers. While users typically want smaller devices to conveniently carry, the challenges to accurately process touch and gesture inputs on touch-screen displays continue with standard touch processing techniques.

SUMMARY

This Summary introduces simplified concepts of angular contact geometry, and the concepts are further described below in the Detailed Description and/or shown in the Figures. This Summary should not be considered to describe essential features of the claimed subject matter, nor used to determine or limit the scope of the claimed subject matter.

Angular contact geometry is described. In embodiments, touch input sensor data is recognized as a touch input on a touch-screen display, such as may be integrated in a mobile phone or portable computing device. A sensor map is generated from the touch input sensor data, and the sensor map represents the touch input. The sensor map can be generated as a two-dimensional array of elements that correlate to sensed contact from the touch input. An ellipse can then be determined that approximately encompasses the elements of the sensor map, and the ellipse represents a contact shape of the touch input.

In other embodiments, the contact shape of a touch input is generally irregular in shape, and the determined ellipse is of a size and rotation angle that approximately encompass the elements of the sensor map. An inaccuracy ratio (IAR) can be determined to validate the ellipse, where the IAR of the ellipse is determined from regions that are within the bounds of the ellipse, but are not part of the sensor map. These regions are also referred to as non-overlapping regions, and are the regions within the bounds of the ellipse that do not overlap an element of the sensor map.

BRIEF DESCRIPTION OF THE DRAWINGS

Embodiments of angular contact geometry are described with reference to the following Figures. The same numbers may be used throughout to reference like features and components that are shown in the Figures.

DETAILED DESCRIPTION

Embodiments of angular contact geometry are described. As noted above, touch and gesture inputs on a touch-screen display of a computing device, such as a mobile phone or portable computer, may not be accurately recognized due to the size of users' fingers when initiating a user-selectable input. This may be particularly noticeable to a user when attempting to touch smaller selectable controls that are displayed in a user interface on a touch-screen display, such as selectable links in a Web page or when trying to resize a user interface with a selectable edge sizing control. Angular contact geometry is implemented to represent a contact shape of a touch input, such as on a touch-screen display of a device, to infer a user-intended touch location on the touch-screen display.

In embodiments, the angular contact geometry is determined from a sensor map that is generated from touch input sensor data, and the sensor map represents a touch input. An ellipse can be determined that approximately encompasses elements of the sensor map, and the ellipse represents a contact shape of the touch input. Generally, the contact shape of a touch input is irregular in shape, and the ellipse of a size and rotation angle approximately encompasses the elements of the sensor map. A quality metric for implementations of angular contact geometry can also be determined.

The quality metric is an inaccuracy ratio (IAR) that can be determined to justify or validate an ellipse. The IAR for an ellipse of a particular size and rotation angle is determined from regions that are within the bounds of the ellipse, but are not part of the sensor map. These regions are also referred to as non-overlapping regions, and are the regions within the bounds of the ellipse that do not overlap an element of the sensor map. A best-fit ellipse has an optimal IAR of the smallest value, where the ellipse with the smallest value IAR encompasses most of the sensor map with the least non-overlapping region area.

While features and concepts of angular contact geometry can be implemented in any number of different devices, systems, environments, networks, and/or configurations, embodiments of angular contact geometry are described in the context of the following example devices, systems, and methods.

Figure 1:
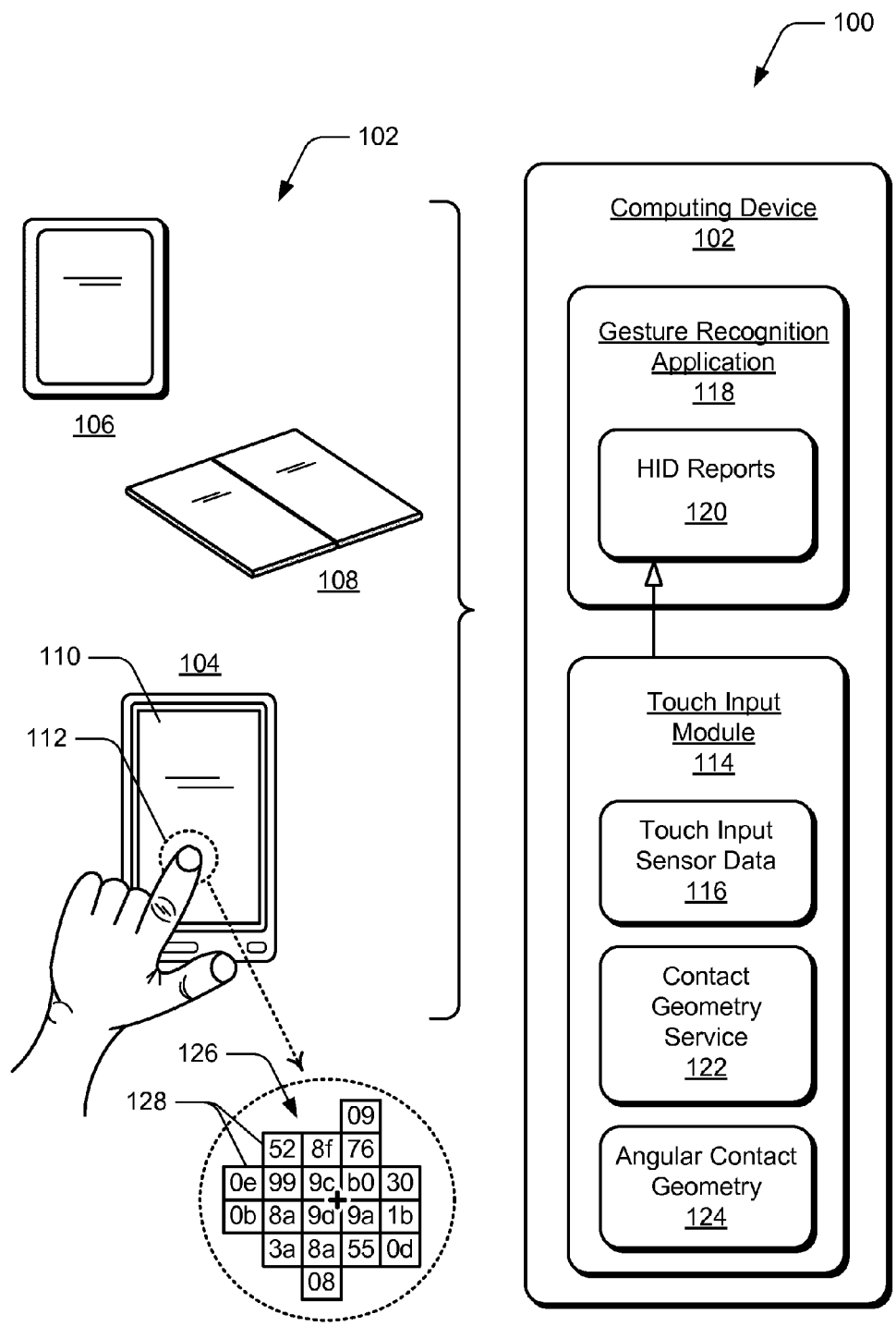
FIG. 1 illustrates an example system in which embodiments of angular contact geometry can be implemented.

FIG. 1 illustrates an example system 100 in which various embodiments of angular contact geometry can be implemented. The example system includes a computing device 102, which may be any one or combination of a mobile phone 104, entertainment device, navigation device, user device, wireless device, portable device, tablet computer 106, dual-screen folding device 108, and the like. The computing device includes an integrated touch-screen display 110, which is implemented to sense the position of a touch input 112, such as a user-selectable input in a user interface that is displayed on the touch-screen display. Any of the computing devices can be implemented with various components, such as one or more processors and memory devices, as well as any number and combination of differing components as further described with reference to the example device shown in FIG. 4.

In the example system 100, the computing device 102 includes a touch input module 114 (e.g., a lower layer component) that is implemented to recognize touch input sensor data 116 as the touch input 112 on the touch-screen display 110. The computing device also includes a gesture recognition application 118 (e.g., a higher layer component) that receives HID reports 120 (i.e., human interface device reports) when generated and output by the touch input module 114. The HID reports include a time and position data, as well as determined angular contact geometry data, such as ellipse axis vectors, that correlates to touch inputs on the touch-screen display of the computing device. The gesture recognition application 118 is implemented to recognize and generate various gestures as determined from touch input data (e.g., the HID reports 120) associated with inputs or combinations of inputs, such as the touch input 112. The gesture recognition application can generate various gestures, such as select gestures, hold gestures, motion gestures, tap gestures, and other types of gestures from various user-selectable inputs.

An input recognition system of the computing device 102 may include any type of input detection features and/or devices to distinguish the various types of inputs, such as sensors (capacitive or resistive), light sensing pixels, touch sensors, cameras, and/or a natural user interface that interprets user interactions, gestures, inputs, and motions. In implementations, the input recognition system can detect motion inputs from discernable variables, such as from a direction variable, from start region position variables and end region position variables, and/or from a motion rate variable (e.g., a particular number of pixels per second).

The computing device 102 also includes a contact geometry service 122 that is implemented to determine the angular contact geometry 124 that corresponds to a touch input on the touch-screen display 110, such as the touch input 112. The contact geometry service can be implemented as computer-executable instructions, such as a software application, and executed by one or more processors to implement the various embodiments described herein. The contact geometry service can also be implemented as firmware on dedicated sensor device hardware in the computing device. In this example, the contact geometry service is shown implemented as a component of the touch input module 114. Alternatively, the contact geometry service may be implemented as an independent software application or service to determine the angular contact geometry.

In embodiments, the contact geometry service 122 is implemented to generate a sensor map 126 from the touch input sensor data 116, and the sensor map represents the touch input 112, such as when a user initiates a touch input with a finger on the touch-screen display 110. In this example, the sensor map includes elements 128 shown as 8-bit hex values that represent the signal strength at an element position in the sensor map. A stronger sensor signal of the touch input sensor data indicates more contact with an element in the sensor map. The sensor map is generated as a two-dimensional array s[x][y], where x and y are the indices of the elements in the two-dimensional grid that correlate to sensed contact from the touch input on the touch-screen display. The stationary baseline level can be subtracted out so that the elements in an area around the sensor map that are not detected as part of the touch input are normalized to a zero level.

The contact geometry service 122 is also implemented to model the sensor map 126 that correlates to the touch input 112 as a Gaussian distribution, with a probabilistic distribution function as in equation (1):

$$p(x) = \frac{1}{2\pi\sqrt{|\Sigma|}}\exp\left(-\frac{1}{2}(x-\mu)^T\Sigma^{-1}(x-\mu)\right) \quad (1)$$

The variable $x=(x,y)$ is an index vector into the two-dimensional sensor map. The parameter $\mu$ is the mean, and the parameter $\Sigma$ is a 2×2 matrix of the covariance matrix. The contact geometry service 122 can determine the parameters $\mu$ and $\Sigma$ so that the probability density function (Gaussian PDF) best fits the sensor map s[x][y] that represents the contact shape of the touch input 112. To do so, the contact geometry service is implemented to perform the maximum likelihood estimation (MLE) to derive the following equations (2) and (3):

$$\hat{\mu} = \frac{1}{N}\sum_{i=0}^{N-1} x_i \quad (2)$$

$$\hat{\Sigma} = \frac{1}{N}\sum_{i=0}^{N-1}(x_i-\hat{\mu})(x_i-\hat{\mu})^T \quad (3)$$

The parameter N is the total number of sample points when performing the MLE. In this implementation, the value of s[x][y] is treated as a histogram of all the samples at a particular index point (x,y). As such, the contact geometry service can derive N as in equation (4):

$$N=\sum_{y=0}^{H-1}\sum_{x=0}^{W-1} s[x][y] \quad (4)$$

The equations (2) and (3) can be rewritten in terms of a weighted sum with s[x][y] as the weight, as in the following equations (5) and (6):

$$\hat{\mu} = \frac{1}{N}\sum_{y=0}^{H-1}\sum_{x=0}^{W-1} s[x][y]x \quad (5)$$

$$\hat{\Sigma} = \frac{1}{N}\sum_{y=0}^{H-1}\sum_{x=0}^{W-1} s[x][y](x-\hat{\mu})(x-\hat{\mu})^T \quad (6)$$

Although the summations are now over the entire two-dimensional grid, the summation can be processed and determined quickly since s[x][y] of the sensor map is non-zero only near the touch input. Note that the parameter $\hat{\mu}$ is the center of mass of the touch input, and the covariance matrix $\hat{\Sigma}$ designates the constant-level contours of the Gaussian distribution, which is the shape of an ellipse. In embodiments, the ellipse represents the contact shape of the touch input. Generally, the contact shape of the touch input is irregular in shape, and the contact geometry service 122 is implemented to determine the ellipse of a size and rotation angle that approximately encompass the elements 128 of the sensor map 126. The contact geometry service determines the ellipse (also referred to as the "best-fit ellipse") from the Gaussian distribution.

In embodiments, the contact geometry service 122 is implemented to determine the ellipse shape from the covariance matrix $\hat{\Sigma}$, recognizing that the two main axis (e.g., minor axis and major axis) of the ellipse correspond to the two Eigenvectors of $\hat{\Sigma}$ that each have a length proportional to the square root of the corresponding Eigen values. Accordingly, the contact geometry service solves the following Eigen problem in equation (7):

$$\hat{\Sigma}\phi = \Lambda\phi \qquad (7)$$

The parameter $\Lambda = \text{diag}(\lambda 0, \lambda 1)$ is the 2×2 diagonal matrix of Eigen values, and the parameter $\phi$ is the Eigen vector matrix of columns that correspond to $\lambda 0$ and $\lambda 1$. For this 2×2 Eigen problem, there exists an exact solution, and the two Eigen values can be determined by solving the following quadratic equation (8):

$$\lambda^2 - Tr(\hat{\Sigma})\lambda + |\hat{\Sigma}| = 0 \qquad (8)$$

Figure 2:
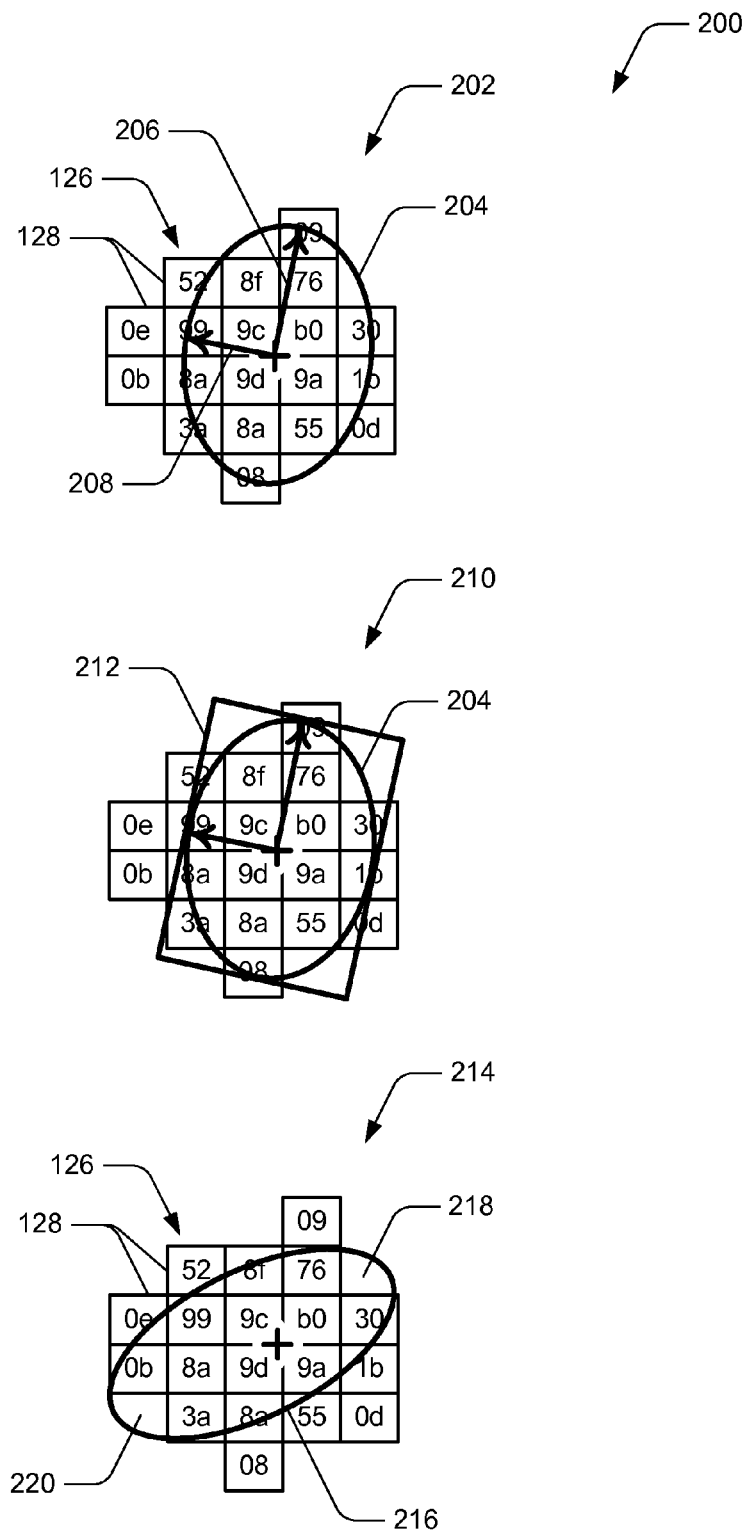
FIG. 2 illustrates an example of a sensor map and an ellipse that approximately encompasses the elements of the sensor map in accordance with one or more embodiments of angular contact geometry.

FIG. 2 illustrates examples 200 of the sensor map 126 and a determined ellipse that approximately encompasses the elements 128 of the sensor map. As shown at 202, an ellipse 204 that corresponds to the contact shape of the touch input 112 is defined by the two axis vectors 206, 208 that are determined by scaling the two Eigen vectors by the squared root of the corresponding Eigen values $\Lambda^{1/2}\phi$. The contact geometry service 122 is implemented to globally scale the Eigen values $\Lambda^{1/2}\phi$ so that the resulting angular contact geometry fits the actual contact shape of the touch input, and an appropriate constant-level contour is selected for the shape matching. In practice, a scaling factor $\alpha$ can also be selected so that the area of the scaled ellipse numerically matches to the actual contact shape of the touch input from s[x][y] of the sensor map 126. As shown at 210, the ellipse 204 can also be represented as a rectangle 212 that bounds the ellipse, where the rectangle is defined by a height, a width, and a rotation angle.

When the two Eigen values are very close, the resulting Eigen vectors may be less stable in their respective directions, and a small perturbation in the sample configuration could substantially change the directions of the main axis. In an implementation, such a case may be noticeable when the contact shape of a touch input is near a round shape and any noise on the edge can change the angle of the contact geometry. Accordingly, it should be noted that for embodiments of angular contact geometry, the shape of the ellipse is the primary consideration, rather than the respective directions of the axis of the ellipse. In the case of a near round shape, the respective directions of the two axis become much less of a consideration, and therefore their instability is much less of a factor, or is not an issue when determining the angular contact geometry.

In embodiments, a quality metric for angular contact geometry can be implemented to justify or validate the determined ellipse that approximately encompasses the elements 128 of the sensor map 126. The contact geometry service 122 can be implemented to determine an inaccuracy ratio (IAR) for an ellipse. As shown at 214, the IAR for an ellipse 216 of a particular size and rotation angle is determinable from regions 218, 220 that are within the bounds of the ellipse, but are not part of the sensor map. The regions are also referred to as non-overlapping regions, and are the regions within the bounds of the ellipse that do not overlap an element of the sensor map.

Theoretically, an ellipse can be selected based on the ellipse that has an optimal IAR of the smallest value, where the ellipse with the smallest value IAR encompasses most of the sensor map with the least non-overlapping region area. For example, an ellipse may not be a good fit to represent the contact shape of a touch input based on the rotation angle of the ellipse. Alternatively or in addition, an ellipse may not be a good fit to represent the contact shape of a touch input based on the size of the ellipse being either too large or too small. The quality metric inaccuracy ratio (IAR) is defined in equation (9) as:

$$\text{InAccuracy Ratio} = \frac{\text{Total non overlapping areas between actual contact and the model}}{\text{Total Area of the model}}$$

Generally, a poor fit of the model ellipse to the actual contact shape of the touch input may result in areas and/or orientations that don't match, and the metric inaccuracy ratio of equation (9) reflects both cases. For the case of an approximate round shape, the non-overlapping area is typically small regardless of the orientation of the axis. The shape of the ellipse may not always fit exactly to the actual contact shape. As such, use of the inaccuracy ratio as a practical quality measure for implementations of angular contact geometry is offset with an optimal inaccuracy ratio (optimal IAR), which is defined in equation (10) as:

$$\text{OptimalIAR} = \min_{\text{model} \in \text{All Models}}(\text{IAR}(\text{model})) \qquad (10)$$

The "model" in this example is the ellipse, and the process of determining the optimal IAR can be performed off-line when searching for possible ellipses to find the optimal value. This quantity reflects the inherent discrepancy between the actual contact shape of the touch input and the model ellipse, and thus, can be subtracted out from the inaccuracy ratio. A normalized inaccuracy ratio as defined in equation (11) below can then be utilized, and a smaller value implies higher quality in implementations of angular contact geometry:

$$\text{NormalizedIAR} = \text{OptimizedIAR} - \text{IAR} \qquad (11)$$

Example method 300 is described with reference to FIG. 3 in accordance with one or more embodiments of angular contact geometry. Generally, any of the services, functions, methods, procedures, components, and modules described herein can be implemented using software, firmware, hardware (e.g., fixed logic circuitry), manual processing, or any combination thereof. A software implementation represents program code that performs specified tasks when executed by a computer processor. The example methods may be described in the general context of computer-executable instructions, which can include software, applications, routines, programs, objects, components, data structures, procedures, modules, functions, and the like. The program code can be stored in one or more computer-readable storage media devices, both local and/or remote to a computer processor. The methods may also be practiced in a distributed computing environment by multiple computer devices. Further, the features described herein are platform-independent and can be implemented on a variety of computing platforms having a variety of processors.

Figure 3:
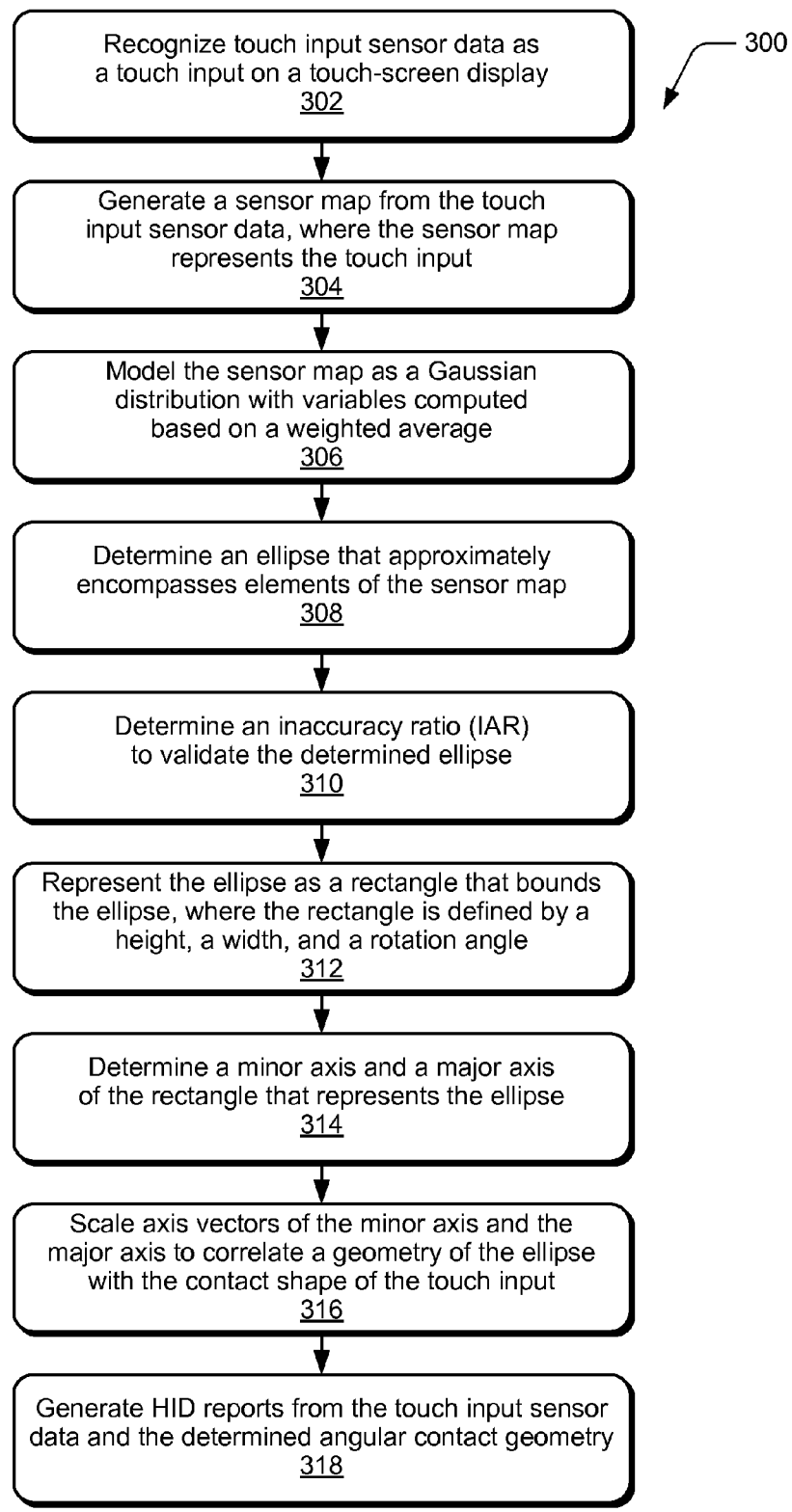
FIG. 3 illustrates example method(s) of angular contact geometry in accordance with one or more embodiments.

FIG. 3 illustrates example method(s) 300 of angular contact geometry. The order in which the method blocks are described are not intended to be construed as a limitation, and any number of the described method blocks can be combined in any order to implement a method, or an alternate method.

At block 302, touch input sensor data is recognized as a touch input on a touch-screen display. For example, the touch input module 114 at the computing device 102 (FIG. 1) recognizes the touch input sensor data 116 as various inputs or combinations of inputs, such as the touch input 112 on the touch-screen display 110 of the computing device.

At block 304, a sensor map is generated from the touch input sensor data, where the sensor map represents the touch input. For example, the contact geometry service 122 at the computing device 102 generates the sensor map 126 from the touch input sensor data 116, and the sensor map represents the touch input 112. The sensor map can be generated as a two-dimensional array s[x][y] of elements that correlate to sensed contact from the touch input on the touch-screen display. A stronger sensor signal of the touch input sensor data indicates more contact with an element 128 in the sensor map.

At block 306, the sensor map is modeled as a Gaussian distribution with variables computed based on a weighted average. For example, the contact geometry service 122 at the computing device 102 models the sensor map 126 that correlates to the touch input 112 as a Gaussian distribution, with a probabilistic distribution function having variables computed based on a weighted average.

At block 308, an ellipse is determined that approximately encompasses elements of the sensor map. For example, the contact geometry service 122 at the computing device 102 determines an ellipse 204 as generated by the Gaussian distribution, and the ellipse approximately encompasses the elements 128 of the sensor map 126. Generally, the contact shape of a touch input may be irregular in shape, and the contact geometry service determines the ellipse of a size and rotation angle that approximately encompasses the elements of the sensor map.

At block 310, an inaccuracy ratio (IAR) is determined to validate the determined ellipse. For example, the contact geometry service 122 at the computing device 102 determines an inaccuracy ratio (IAR) to validate the determined ellipse size and rotation angle. The IAR for an ellipse of a particular size and rotation angle is determined from one or more regions that are within the bounds of the ellipse, but are not part of the sensor map. The non-overlapping regions are the regions within the bounds of the ellipse that do not overlap an element of the sensor map. A best-fit ellipse has an optimal IAR of the smallest value and encompasses most of the sensor map with the least non-overlapping region area, and the best-fit ellipse represents the contact shape of the touch input.

At block 312, the ellipse is represented as a rectangle that bounds the ellipse, where the rectangle is defined by a height, a width, and a rotation angle. For example, the contact geometry service 122 at the computing device 102 represents the best-fit ellipse 204 as the rectangle 212 that bounds the ellipse, and the rectangle is defined by a height, a width, and a rotation angle that correlates with the ellipse.

At block 314, a minor axis and a major axis of the rectangle are determined that represents the ellipse and, at block 316, the axis vectors of the minor axis and the major axis are scaled to correlate a geometry of the ellipse with the contact shape of the touch input.

At block 318, HID reports are generated from the touch input sensor data and the determined angular contact geometry. For example, the touch input module 114 at the computing device 102 generates the HID reports 120 (i.e., human interface device reports). The HID reports include a time and position data, as well as determined angular contact geometry data, that correlates to touch inputs on the touch-screen display of the computing device.

Figure 4:
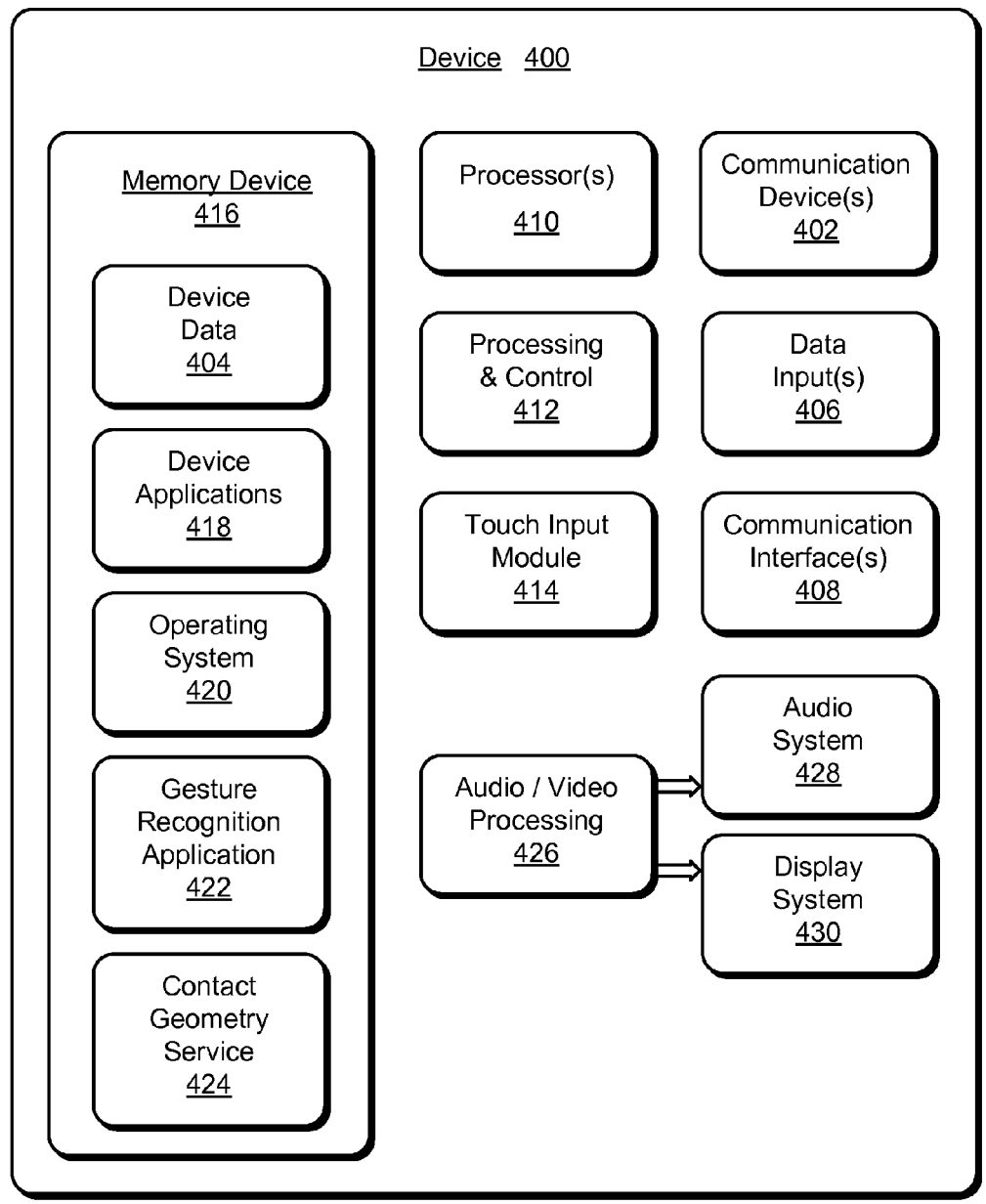
FIG. 4 illustrates various components of an example device that can implement embodiments of angular contact geometry.

FIG. 4 illustrates various components of an example device 400 that can be implemented as any of the devices, or services implemented by devices, described with reference to the previous FIGS. 1-3. In embodiments, the device may be implemented as any one or combination of a fixed or mobile device, in any form of a consumer, computer, portable, user, communication, phone, navigation, television, appliance, gaming, media playback, and/or electronic device. The device may also be associated with a user (i.e., a person) and/or an entity that operates the device such that a device describes logical devices that include users, software, firmware, hardware, and/or a combination of devices.

The device 400 includes communication devices 402 that enable wired and/or wireless communication of device data 404, such as received data, data that is being received, data scheduled for broadcast, data packets of the data, etc. The device data or other device content can include configuration settings of the device, media content stored on the device, and/or information associated with a user of the device. Media content stored on the device can include any type of audio, video, and/or image data. The device includes one or more data inputs 406 via which any type of data, media content, and/or inputs can be received, such as user-selectable inputs and any other type of audio, video, and/or image data received from any content and/or data source.

The device 400 also includes communication interfaces 408, such as any one or more of a serial, parallel, network, or wireless interface. The communication interfaces provide a connection and/or communication links between the device and a communication network by which other electronic, computing, and communication devices communicate data with the device.

The device 400 includes one or more processors 410 (e.g., any of microprocessors, controllers, and the like) which process various computer-executable instructions to control the operation of the device. Alternatively or in addition, the device can be implemented with any one or combination of software, hardware, firmware, or fixed logic circuitry that is implemented in connection with processing and control circuits which are generally identified at 412. In embodiments, the device 400 can also include a touch input module 414 that is implemented to recognize touch input sensor data. Although not shown, the device can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

The device 400 also includes one or more memory devices 416 (e.g., computer-readable storage media) that enable data storage, such as random access memory (RAM), non-volatile memory (e.g., read-only memory (ROM), flash memory, etc.), and a disk storage device. A disk storage device may be implemented as any type of magnetic or optical storage device, such as a hard disk drive, a recordable and/or rewriteable disc, and the like. The device may also include a mass storage media device.

Computer readable media can be any available medium or media that is accessed by a computing device. By way of example, and not limitation, computer readable media may comprise storage media and communication media. Storage media include volatile and non-volatile, removable and non-removable media implemented in any method or technology for storage of information, such as computer-readable instructions, data structures, program modules, or other data. Storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by a computer.

Communication media typically embody computer-readable instructions, data structures, program modules, or other data in a modulated data signal, such as carrier wave or other transport mechanism. Communication media also include any information delivery media. A modulated data signal has one or more of its characteristics set or changed in such a manner as to encode information in the signal. By way of example, and not limitation, communication media include wired media such as a wired network or direct-wired connection, and wireless media such as acoustic, RF, infrared, and other wireless media.

A memory device 416 provides data storage mechanisms to store the device data 404, other types of information and/or data, and various device applications 418. For example, an operating system 420 can be maintained as a software application with the memory device and executed on the processors. The device applications may also include a device manager, such as any form of a control application, software application, signal processing and control module, code that is native to a particular device, a hardware abstraction layer for a particular device, and so on. In this example, the device applications 418 include a gesture recognition application 422 and a contact geometry service 424 that implement embodiments of angular contact geometry as described herein.

The device 400 also includes an audio and/or video processing system 426 that generates audio data for an audio system 428 and/or generates display data for a display system 430. The audio system and/or the display system may include any devices that process, display, and/or otherwise render audio, video, display, and/or image data. Display data and audio signals can be communicated to an audio device and/or to a display device via an RF (radio frequency) link, S-video link, composite video link, component video link, DVI (digital video interface), analog audio connection, or other similar communication link. In implementations, the audio system and/or the display system are external components to the device. Alternatively, the audio system and/or the display system are integrated components of the example device, such as an integrated touch-screen display.

Although embodiments of angular contact geometry have been described in language specific to features and/or methods, the subject of the appended claims is not necessarily limited to the specific features or methods described. Rather, the specific features and methods are disclosed as example implementations of angular contact geometry.

The invention claimed is:

1. A method, comprising:
recognizing touch input sensor data as a touch input on a touch-screen display;
generating a sensor map from the touch input sensor data, the sensor map representing the touch input;
modeling the sensor map as a Gaussian distribution;
determining an ellipse that approximately encompasses the sensor map from the Gaussian distribution, the ellipse representing a contact shape of the touch input; and
validating the ellipse based on an inaccuracy ratio (IAR) of the ellipse, the IAR of the ellipse determined from one or more regions that are within the bounds of the ellipse, but are not part of the sensor map.

2. A method as recited in claim 1, wherein:
the contact shape of the touch input is irregular in shape; and
the ellipse is of a size and rotation angle that approximately encompasses the sensor map.

3. A method as recited in claim 1, wherein the sensor map is generated as a two-dimensional array of elements that correlate to sensed contact from the touch input on the touch-screen display.

4. A method as recited in claim 3, wherein a stronger sensor signal of the touch input sensor data indicates more contact with an element in the sensor map.

5. A method as recited in claim 1, further comprising:
determining a minor axis and a major axis of the ellipse from a covariance matrix; and
scaling axis vectors of the minor axis and the major axis to correlate a geometry of the ellipse with the contact shape of the touch input.

6. A method as recited in claim 1, wherein a best-fit ellipse has an optimal IAR of the smallest value and encompasses most elements of the sensor map with the least non-overlapping region area.

7. A method as recited in claim 6, further comprising determining a normalized IAR based on the determined IAR and the optimal IAR.

8. A computing device, comprising:
a touch-screen display;
a touch input module configured to recognize touch input sensor data as a touch input on the touch-screen display;
at least a memory and a processor to implement a contact geometry service configured to:
generate a sensor map from the touch input sensor data, the sensor map representing the touch input and modeled as a Gaussian distribution;
determine an ellipse that approximately encompasses the sensor map from the Gaussian distribution, the ellipse representing a contact shape of the touch input; and
validate the ellipse based on an inaccuracy ratio (IAR) of the ellipse, the IAR of the ellipse being determinable from one or more regions that are within the bounds of the ellipse, but are not part of the sensor map.

9. A computing device as recited in claim 8, wherein:
the contact shape of the touch input is irregular in shape; and
the ellipse is of a size and rotation angle that approximately encompasses the sensor map.

10. A computing device as recited in claim 8, wherein the contact geometry service is further configured to generate the sensor map as a two-dimensional array of elements that correlate to sensed contact from the touch input on the touch-screen display.

11. A computing device as recited in claim 10, wherein a stronger sensor signal of the touch input sensor data indicates more contact with an element in the sensor map.

12. A computing device as recited in claim 8, wherein the contact geometry service is further configured to:
determine a minor axis and a major axis of the ellipse from a covariance matrix; and
scale axis vectors of the minor axis and the major axis to correlate a geometry of the ellipse with the contact shape of the touch input.

13. A computing device as recited in claim 12, wherein the contact geometry service is configured to said scale the axis vectors using a global scaling factor and scaling factors determined from the covariance matrix.

14. A method, comprising:
generating a sensor map from touch input sensor data that is received as a touch input, the sensor map generated as a two-dimensional array of elements that correlate to sensed contact from the touch input;
modeling the sensor map as a Gaussian distribution with variables computed based on a weighted average;

determining an ellipse from the Gaussian distribution, the ellipse representing a contact shape of the touch input and approximately encompassing the elements of the sensor map; and validating the ellipse based on an inaccuracy ratio (IAR) of the ellipse, the IAR of the ellipse determined from one or more regions that are within the bounds of the ellipse, but are not part of the sensor map.

15. A method as recited in claim 14, further comprising generating HID reports (human interface device reports) that include a time, position data, and angular contact geometry data that correlates to the touch input.

16. A method as recited in claim 14, wherein a best-fit ellipse has an optimal IAR of the smallest value and encompasses most of the elements of the sensor map with the least non-overlapping region area.

17. A method as recited in claim 16, further comprising determining a normalized IAR based on the determined IAR and the optimal IAR, and wherein said determining the optimal IAR is performed off-line.

18. A method as recited in claim 14, further comprising representing the ellipse as a rectangle that bounds the ellipse, the rectangle defined by a height, a width, and a rotation angle.

19. A method as recited in claim 18, further comprising:

determining a minor axis and a major axis of the rectangle that represents the ellipse; and scaling axis vectors of the minor axis and the major axis to correlate a geometry of the ellipse with the contact shape of the touch input.

20. A method as recited in claim 14, wherein:

the contact shape of the touch input is irregular in shape; and the ellipse is of a size and rotation angle that approximately encompasses the sensor map.

* * * * *